(12) United States Patent
Kobori et al.

(10) Patent No.: US 10,936,093 B2
(45) Date of Patent: Mar. 2, 2021

(54) POSITION DETECTION SENSOR AND POSITION DETECTION MODULE

(71) Applicant: Wacom Co., Ltd., Saitama (JP)

(72) Inventors: Takeshi Kobori, Tokyo (JP); Naoko Kishi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 22 days.

(21) Appl. No.: 16/036,421

(22) Filed: Jul. 16, 2018

(65) Prior Publication Data

US 2019/0064944 A1 Feb. 28, 2019

(30) Foreign Application Priority Data

Aug. 22, 2017 (JP) .............................. JP2017-159536

(51) Int. Cl.
*G06F 3/0354* (2013.01)
*G06F 3/041* (2006.01)
*G06F 3/044* (2006.01)
*G06F 3/046* (2006.01)

(52) U.S. Cl.
CPC .......... *G06F 3/03545* (2013.01); *G06F 3/044* (2013.01); *G06F 3/046* (2013.01); *G06F 3/0412* (2013.01); *G06F 3/0416* (2013.01)

(58) Field of Classification Search
None
See application file for complete search history.

(56) References Cited

U.S. PATENT DOCUMENTS

| 9,778,803 B2* | 10/2017 | Sato | G06F 3/0416 |
|---|---|---|---|
| 2012/0306824 A1* | 12/2012 | Horie | G06F 3/03545 345/179 |
| 2013/0199311 A1* | 8/2013 | Horie | G01L 1/142 73/862.626 |
| 2015/0049031 A1* | 2/2015 | Maruoka | G06F 3/03545 345/173 |
| 2017/0177123 A1 | 6/2017 | Kobori et al. | |
| 2018/0321539 A1* | 11/2018 | Koide | G02F 1/13452 |
| 2018/0364846 A1* | 12/2018 | Ahn | G06F 3/0412 |
| 2019/0012029 A1* | 1/2019 | Hong | G06F 3/0416 |
| 2019/0042038 A1* | 2/2019 | Lee | G06F 3/047 |

FOREIGN PATENT DOCUMENTS

WO    2016/056272 A1    4/2016

\* cited by examiner

*Primary Examiner* — Krishna P Neupane
(74) *Attorney, Agent, or Firm* — Seed IP Law Group LLP (57) ABSTRACT

A position detection sensor configured to be used with a display device having a display screen with a curved portion included on an outer edge thereof. The position detection sensor includes a plurality of electrodes arranged in a detection area and configured to detect a position on the display screen pointed to by a pointer. One or more of the electrodes as arranged in the detection area conform to the curved portion of the display screen in a partly-curved contour region of the detection area corresponding to a predetermined region of the display device that includes the curved portion of the display screen. A position detection module including the display device and position detection sensor is also disclosed.

18 Claims, 7 Drawing Sheets

FIG.7B

POSITION DETECTION SENSOR AND POSITION DETECTION MODULE

CROSS-REFERENCE TO RELATED APPLICATION

This application claims the priority of Japanese Patent Application No. 2017-159536 filed Aug. 22, 2017, which is incorporated herein by reference.

BACKGROUND

Technical Field

The present disclosure relates to a position detection sensor that allows pointing and input, for example, by a pointer such as an electronic pen or user's finger and also to a position detection module that uses the position detection sensor.

Background Art

A variety of electronic devices in each of which a display screen accounts for a majority of a front side of a casing, such as high-performance mobile phone terminals called "smartphones" and tablet personal computers (PCs), are widely used. Mounted in such an electronic device is a position detection module, which includes a position detection sensor having a detection area corresponding to the display screen and a position detection circuit configured to detect a pointed position based on an output from the position detection sensor. Owing to this configuration, a user can simply perform pointing and input by moving or positioning a pointer such as an electronic pen or his or her finger on the display screen.

In electronic devices such as smartphones and tablet PCs, it has been a conventional practice to square up the four corners (four vertices) of a display screen so that the display screen can be made as large as possible and information can be appropriately displayed at every point on the display screen. By the technique disclosed in WO 2016/056272 A1 and the like, techniques have also been developed for position detection sensors to enlarge a detection area in correspondence to a display screen and to reduce its peripheral dead areas as much as possible.

Keeping in step with the progress of the technology for the enlargement of a detection area in a position detection sensor and the reduction of peripheral dead areas in the detection area as mentioned above, it has become possible to mount a display device of greater display screen size on a smartphone or tablet PC without changing its overall size. As the designs of smartphones and the like, those curved at the four corners have been increasing in recent years. With this as a background, it has also been practiced to have the four corners of a display screen curved and to make the display screen closer to the size of the main body of a smartphone or the like without reducing the amount of information that can be displayed on the display screen.

However, conventional position detection sensors have been developed correspondingly to display screens squared at four corners. If a conventional position detection sensor is applied to a display screen curved at its four corners, the right-angle portions in the four corners, therefore, protrude significantly from the display screen so that the position detection sensor may not be accommodated within the main body of a smartphone or the like in some instances. It may also be contemplated to use a display unit having a display screen with a curved portion contained on a part of an outer edge of the display screen without being restricted to the four corners of the display screen.

BRIEF SUMMARY

With the foregoing in view, the present disclosure relates to a position detection sensor and also to a position detection module, and has as an object thereof the allowance of appropriate detection of a pointed position on a display screen even if a display screen having a curved portion on an outer edge thereof is used.

To achieve the above-described object, there is provided, in a first aspect of the present disclosure, a position detection sensor configured to be used with a display device having a display screen with a curved portion included on an outer edge thereof. The position detection sensor includes a plurality of electrodes arranged in a detection area and configured to detect a position on the display screen pointed to by a pointer. One or more of the electrodes arranged in the detection area conform to the curved portion of the display screen in a partly-curved contour region of the detection area corresponding to a predetermined region of the display device that includes the curved portion of the display screen.

The position detection sensor according to the first aspect of the present disclosure is configured to be arranged adjacent to the display device having the display screen with the curved portion included on the outer edge thereof. Further, in the position detection sensor, one or more of the electrodes arranged in the detection area conform to the curved portion of the display screen in the partly-curved contour region of the detection area corresponding to the predetermined region of the display device that includes the curved portion of the display screen.

Owing to the configuration described above, the position detection sensor has the detection area corresponding to the display screen of the display device, the display screen including the curved portion on the outer edge thereof. Therefore, even if a display screen including a curved portion on an outer edge thereof is used, a position pointed on the display screen can be appropriately detected.

DETAILED DESCRIPTION

With reference to the drawings, a description will hereinafter be made about some embodiments of the position detection sensor and position detection module according to the present disclosure.

First Embodiment

[Appearance Configuration of Electronic Device]

Figure 1:
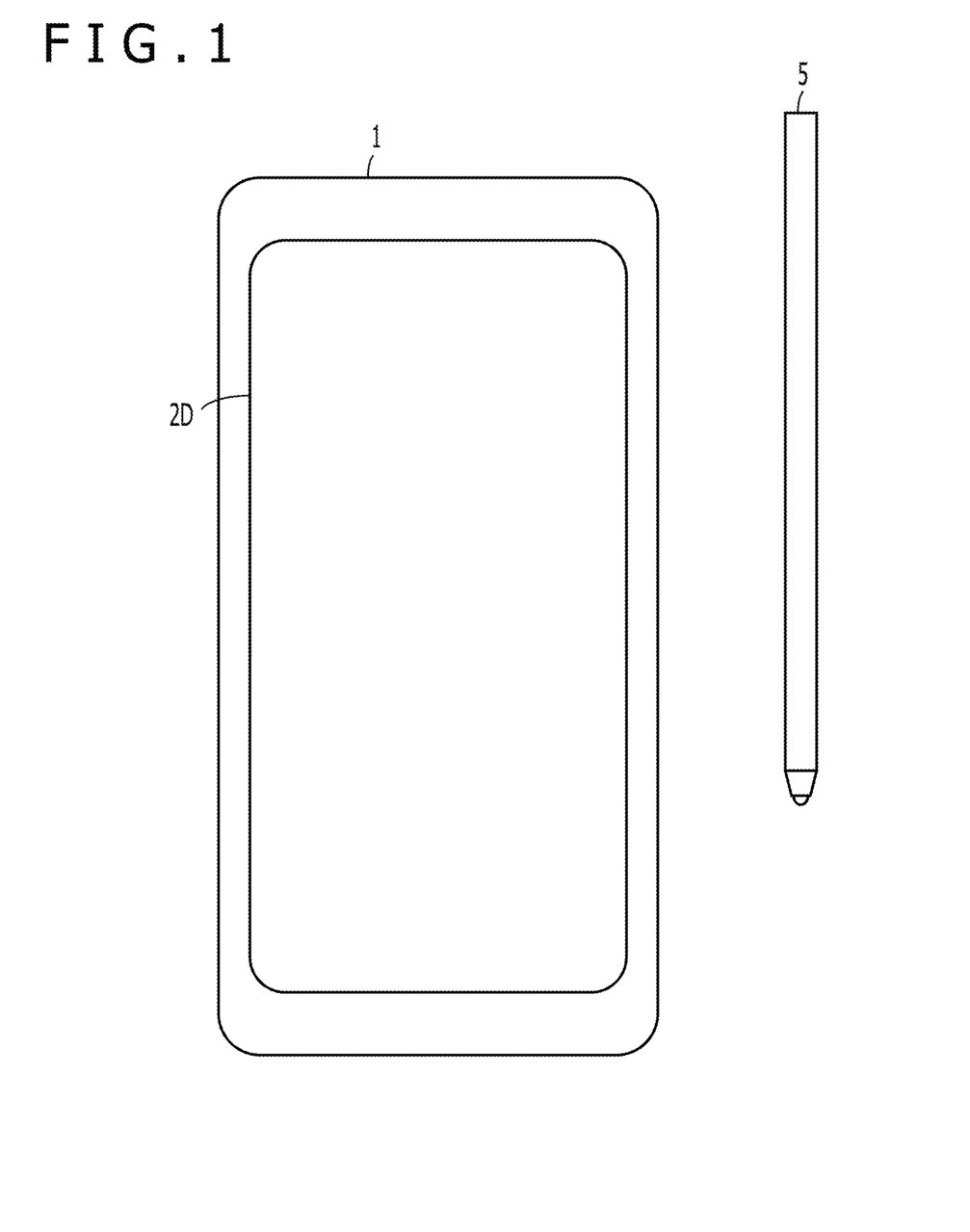
FIG. 1 is a view for describing the appearance of a high-performance mobile phone terminal, to which an embodiment of the position detection sensor or position detection module of the present disclosure is to be applied, and the appearance of an electronic pen.

FIG. 1 is a view illustrating the appearance of a high-performance mobile phone terminal (smartphone) as an example of an electronic device, to which a first embodiment of the position detection sensor or position detection module according to the present disclosure is to be applied, and the appearance of an electronic pen to be used for allowing pointing and input to the high-performance mobile phone terminal. The high-performance mobile phone terminal designated at numeral 1 has a configuration that a relatively-large display screen 2D of a display device 2 (see FIG. 2) is exposed. In this embodiment, the display device 2 can be, for example, a liquid crystal display (LCD). Four vertices on outer edges of the display screen 2D of the LCD 2 are not squared but are rounded, so that the four vertices are formed as curved portions and give a soft impression in design. As described in the above, the display screen 2D of the LCD 2 in the first embodiment includes the curved portions on its outer edges.

Although not illustrated in FIG. 1, a position detection module 100 (see FIG. 4) is mounted on the high-performance mobile phone terminal 1. The position detection module 100 includes a position detection sensor 3 (see FIG. 2) having a detection area 3E (see FIG. 2) corresponding to the entire surface of the display screen 2D so that a pointed position can be appropriately detected wherever position on the display screen 2D is pointed. On the other hand, the electronic pen designated at numeral 5 is used while being held by user's hand, and functions as a pen-type position pointer (coordinate pointer) to be used upon inputting information to the high-performance mobile phone terminal 1. The display screen 2D includes, for example, protection glass or the like disposed thereon. Using the upper surface of the display screen 2D as an operation surface via the protection glass, pointing and input can be performed by the electronic pen 5.

Now assume that in the high-performance mobile phone terminal 1, a position pointing operation has been performed by the electronic pen 5 on the display screen 2D. Here, based on a detection output from the position detection sensor 3 that has the detection area 3E corresponding to the display screen 2D, a processing control unit (e.g., microprocessor) included in the position detection module 100 specifies the position pointed on the display screen 2D. Information which indicates the pointed position specified at the processing control unit is fed to an information processing unit mounted on the high-performance mobile phone terminal 1, and processing can be performed according to the information. The information processing unit can realize various functions such as, for example, browser functions, e-mail functions and telecommunication functions. As described in the above, the high-performance mobile phone terminal 1 is an electronic device (information processor) that requires, as a main input device, a device configured of the position detection module 100, which has the position detection sensor 3, and the electronic pen 5.

It is to be noted that position detection modules, which allow the pointing and input of a position with an electronic pen of the signal transmission type, include those of the electromagnetic resonance technology (EMR) type, those of the active capacitive coupling type, those of the passive capacitive coupling type, and so on.

The present disclosure can be applied to any type of position detection sensor and position detection module. Hereinafter, a description will first be made about a case in which as a first embodiment, the present disclosure is applied to a position detection sensor and position detection module of the electromagnetic resonance technology type. Another description will then be made about another case in which as a second embodiment, the present disclosure is applied to a position detection sensor and position detection module of the capacitive coupling type.

[Schematic Configuration of High-Performance Mobile Phone Terminal 1]

Figure 2:
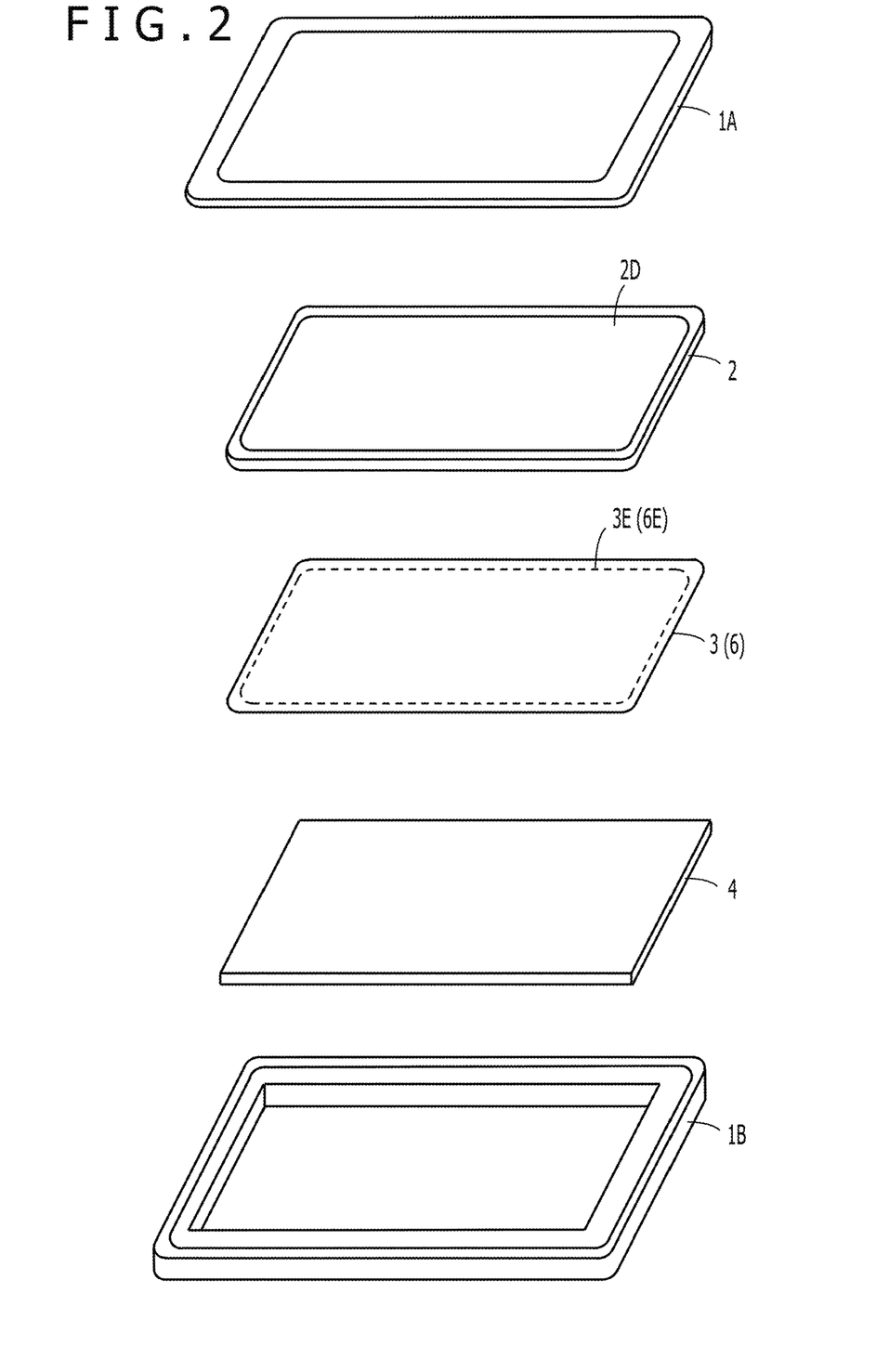
FIG. 2 is an exploded perspective view for describing the schematic configuration of the high-performance mobile phone terminal of FIG. 1.

FIG. 2 is an exploded perspective view for describing the schematic configuration of the high-performance mobile phone terminal 1. As illustrated in FIG. 2, in the high-performance mobile phone terminal 1, a motherboard 4 is accommodated as a lowermost layer in a casing 1B, and the position detection sensor 3 according to the present disclosure is stacked on the motherboard 4. On this position detection sensor 3, the LCD 2 as a display device is arranged with the display screen 2D directed upward (toward a front panel 1A). Further, the front panel 1A is arranged over the display screen 2D of the LCD 2, and the individual component members 4, 3 and 2 so accommodated are held in the casing 1B.

On the motherboard 4, various circuits such as a communication circuit, a control circuit for the LCD 2, and a position detection circuit 102 (see FIG. 4) to be described subsequently herein are mounted although not illustrated in any figure. The position detection sensor 3 is configured by applying the present disclosure, and makes up the position detection module 100 in combination with the position detection circuit 102 mounted on the motherboard 4. The LCD 2 is connected to the control circuit for the LCD 2, and functions as a display device in the high-performance mobile phone terminal 1. Formed through the front panel 1A is an opening through which the display screen 2D of the LCD 2 is exposed, and the protection glass or the like is arranged in the opening as also mentioned above.

In this first embodiment, the whole LCD 2 and the whole position detection sensor 3 are identical to each other in both shape and size as illustrated in FIG. 2. The display screen 2D of the LCD 2 is rectangular, and as also mentioned above, its vertex portions are rounded and formed as curved portions. The detection area 3E of the position detection sensor 3 is substantially the same in both shape and size as the display screen 2D of the LCD 2. Therefore, the detection area 3E of the position detection sensor 3 is also rectangular, and its vertex portions are also rounded and formed as curved portions.

As illustrated in FIG. 2, the detection area 3E of the position detection sensor 3 is arranged correspondingly to the entire surface of the display screen 2D of the LCD 2. Therefore, individual positions on the display screen 2D precisely correspond to individual positions on the detection area 3E of the position detection sensor 3, so that a pointed position can be accurately detected wherever position on the display screen 2D is pointed. It is to be noted that the detection area 3E of the position detection sensor 3 is in an identical or similar relation with the display screen 2D of the LCD 2.

That the display screen 2D and the detection area 3E are identical means that the shape and size (area) are the same between both of them. Further, that the display screen 2D and the detection area 3E are similar means that between both of them, the shape is the same but the size (area) is different. In other words, that the detection area 3E and the display screen 2D are similar means that the detection area 3E can be completely superposed on the display screen 2D if uniformly enlarged or reduced. If the detection area 3E and the display screen 2D are in a similar relation, the detection area 3E may preferably have the same area as the display screen 2D or may preferably be a little greater (in size) than the display screen 2D. As a reason for this, the detection area 3E of such a size enables to appropriately detect a pointed position in an end part of the display screen 2D.

Further, as illustrated in FIG. 2, the four vertices of the main body of the high-performance mobile phone terminal 1, which is constructed of the front panel 1A and the casing 1B, are rounded and formed as curved portions. In addition, the vertices on the outer edges of the LCD 2 and position detection sensor 3 are also rounded and formed as curved portions. Owing to these configurations, the LCD 2 and position detection sensor 3 have a size close to the size of the main body of the high-performance mobile phone terminal 1.

[Configuration of Detection Area 3E of Position Detection Sensor 3]

As mentioned above, the display screen 2D of the LCD 2 includes the curved portions on parts of its outer edges. The four corners of the position detection sensor 3 have a shape including a curved portion like the display screen 2D of the LCD 2. The detection area 3E of the position detection sensor 3 is in an identical or similar relation with the display screen 2D of the LCD 2. Therefore, the detection area 3E has curved portions on its outer edges thereof in correspondence to the display screen 2D.

Figure 3A:
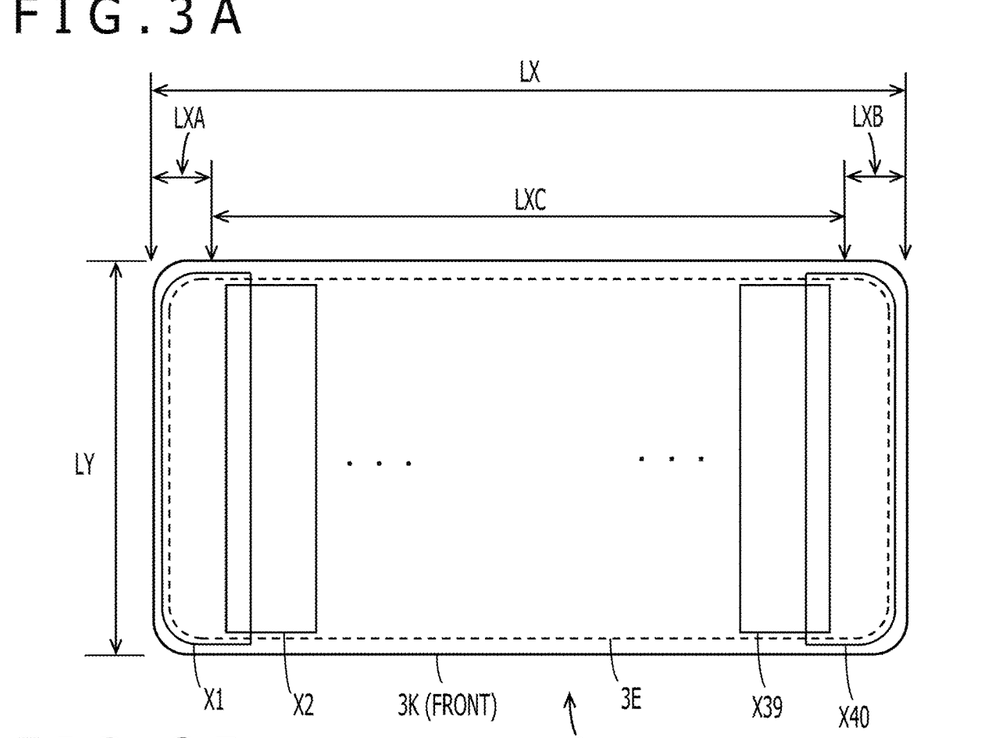
FIGS. 3A and 3B are views for making a description about a configuration example of the position detection sensor according to a first embodiment of the present disclosure.
Figure 3B:
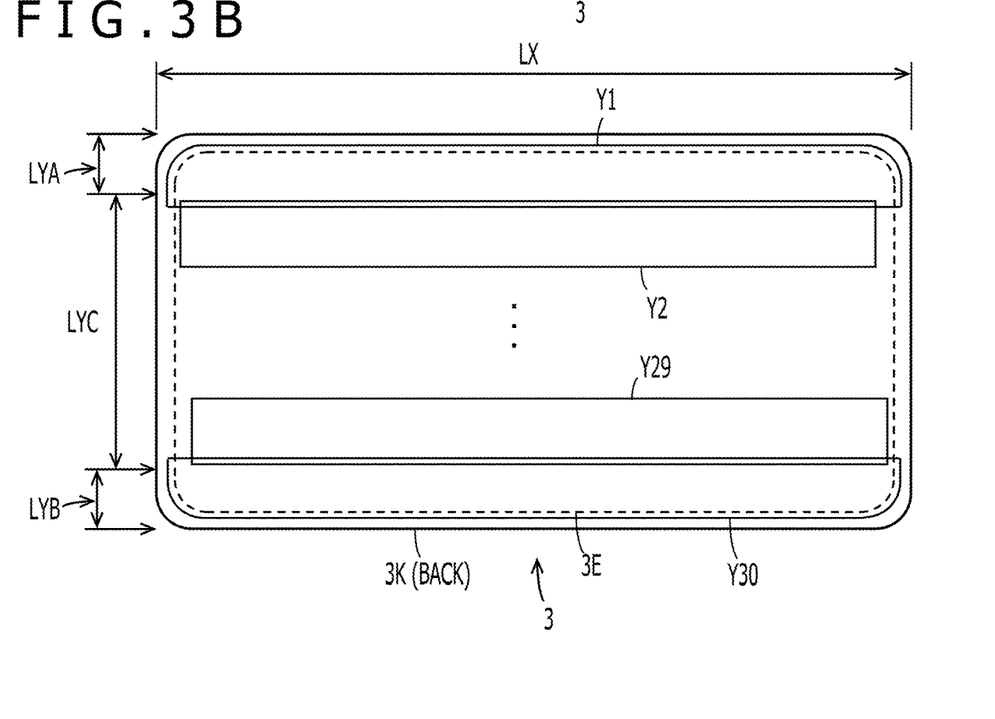

FIGS. 3A and 3B are views for making a description about a configuration example of the position detection sensor 3. In the position detection sensor 3, loop coils are arranged as electrodes on a rectangular insulating film 3K of length LX in a longitudinal direction (X-axis direction) and length LY in a direction (Y-axis direction) that intersects the longitudinal direction. In other words, the insulating film K serves as a substrate in the position detection sensor 3.

As illustrated in FIG. 3A, one side of the insulating film 3K is placed as a front side, and on this front side, a loop coil group 31X (see FIG. 4) that includes 40 loop coils X1, X2, . . . , and X40 in this example is formed in the longitudinal direction (X-axis direction). As illustrated in FIG. 3B, on the other hand, the other side of the insulating film 3K is placed as a back side, and on this back side, a loop coil group 31Y (see FIG. 4) that includes 30 loop coils Y1, Y2, . . . , and Y30 in this example is formed in the direction (Y-axis direction) that intersects the longitudinal direction. The position detection sensor 3 is disposed so that the front side on which the loop coil group 31X is formed faces the side of the LCD 2 (becomes an upper side).

In FIGS. 3A and 3B, the inside of a part indicated by a dashed line on the insulating film 3K is the detection area 3E. As illustrated in FIG. 3A, on the front side of the insulating film 3K, a vertically-long, partly-curved contour region is provided in a left-end part as viewed in the X-axis direction. The vertically-long, partly-curved contour region is surrounded by long sides of length LY in the Y-axis direction and short sides of length LXA in the X-axis direction from the left end of the position detection sensor 3. In this case, the right ends of the short sides of length LXA in the X-axis direction are change points where the outer edges become curved lines in the detection area 3E. Described specifically, if the upper and lower, outer edges of the detection area 3E as viewed in a direction extending in the X-axis direction are progressively followed in a direction toward the left end of the detection area 3E, for example, from around the centers of the outer edges, the outer edges gradually become curved lines past the right ends of length LXA in the X-axis direction.

A loop coil arranged in the partly-curved contour region on the side of the left end (the region of LY×LXA) of the position detection sensor 3 is shaped, at portions thereof located at least near the curved portions on the outer edges of the detection area 3E, in forms conforming to the respective curved portions. In the case of FIG. 3A, the loop coil X1 is shaped, at portions thereof that extend from left-side portions of the upper and lower, short sides thereof to the long side on the left side of the partly-curved contour region (the two vertex portions on the left side of the detection area 3E), in curved forms in conformity to the respective curved portions. The coil arranged on the right-end side in the X-axis direction of FIG. 3A has a similar form to that of the loop coil arranged on the left-end side.

On the front side of the insulating film 3K, as illustrated in FIG. 3A, the region other than the vertically-long, partly-curved contour regions provided on the sides of the horizontally opposite ends, specifically the horizontally-long region flanked by the left and right, partly-curved contour regions and surrounded by the sides of length LY in the Y-axis direction and the sides of length LXC in the X-axis direction will hereinafter be referred to as "the straight contour region." The loop coils located in the straight contour region are straight along both the short sides and the long sides of the straight contour region as in the past. It is to be noted that the individual loop coils X1, X2, . . . disposed on the front side of the insulating film 3K are arranged so that each loop coil and its adjacent loop coil or coils overlap each other at parts thereof. It is, therefore, configured to avoid the occurrence of any dead zone, in which the detection of a pointed position is not feasible, on the detection area 3E.

On the back side of the insulating film 3K, on the other hand, as illustrated in FIG. 3B, a horizontally-long, partly-curved contour region surrounded by short sides of length LYA in the Y-axis direction from the upper end of the position detection sensor 3 and long sides of length LX in the X-axis direction is provided in an upper end part in the Y-axis direction. The lower ends of both of the short sides of length LYA in the Y-axis direction in this case are change points where the outer edges become curved lines in the detection area 3E. Described specifically, if the respective, left and right, outer edges of the detection area 3E as viewed in the direction extending in the Y-axis direction are progressively followed in a direction toward the upper end of the detection area 3E, for example, from around the centers of the outer edges, the outer edges gradually become curved lines past the lower ends of length LYA in the Y-axis direction.

A loop coil arranged in the partly-curved contour region (the region of LYA×LX) on the side of the upper end of the position detection sensor 3 is shaped, at portions thereof located at least near the curved portions of the outer edges of the detection area 3E, in forms conforming to the respective curved portions. In the case of FIG. 3B, the loop coil Y1 is shaped, at portions thereof that extend from upper-side portions of the left and right, short sides thereof to the long side on the upper side of the partly-curved contour region (the two vertex portions on the upper side of the detection area 3E), in curved forms conforming to the respective curved portions. As illustrated in FIG. 3B, the coil arranged on the lower-end side in the Y-axis direction has a similar form to that of the loop coil arranged on the upper-end side.

On the back side of the insulating film 3K, as illustrated in FIG. 3B, the region other than the horizontally-long, partly-curved contour regions provided on the sides of the vertically opposite ends, specifically the horizontally-long region flanked by the upper and lower, partly-curved contour regions and surrounded by the sides of length LYC in the Y-axis direction and the sides of length LX in the X-axis direction will hereinafter be referred to as "the straight contour region." The loop coils located in the straight contour region are straight along both the short sides and the long sides of the straight contour region as in the past. It is to be noted that the individual loop coils Y1, Y2, . . . disposed on the back side of the insulating film 3K are arranged so that each loop coil and its adjacent loop coil or coils overlap each other at parts thereof. It is, therefore, configured to avoid the occurrence of any dead zone, in which the detection of a pointed position is not feasible, on the detection area 3E.

As described above, the loop coil group 31X and loop coil group 31Y are formed on the front side and back side, respectively, of the insulating film 3K as the substrate, whereby the position detection sensor 3 is formed. In the position detection sensor 3, the detection area 3E is, therefore, formed correspondingly to the display screen 2D of the LCD 2 with the four vertex portions of the detection area 3E being formed as curved portions correspondingly to the display screen 2D.

[Circuit Configuration Examples of Position Detection Module 100 and Electronic Pen 5 of Electromagnetic Resonance Technology Type]

Figure 4:
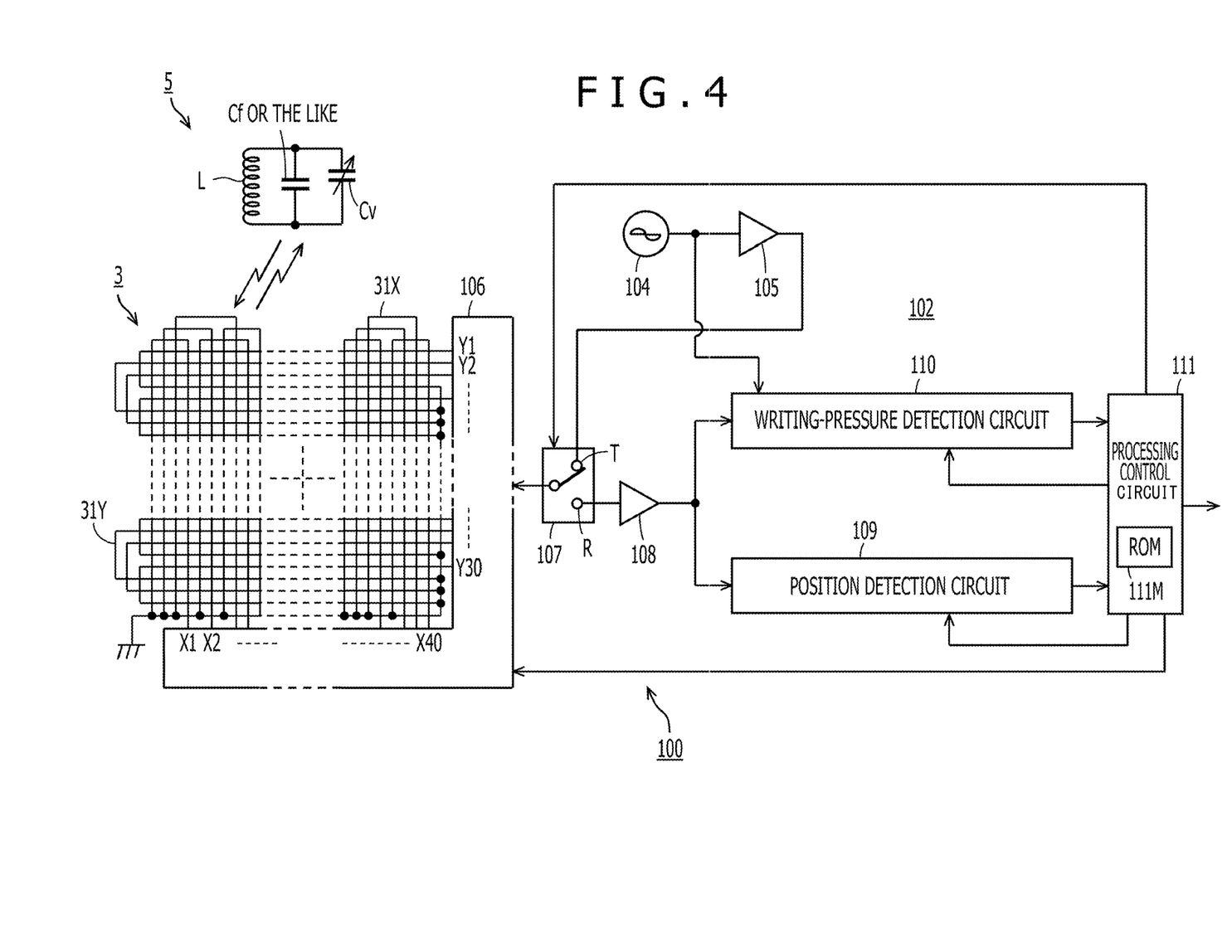
FIG. 4 is a diagram illustrating circuit configuration examples of a position detection module according to the first embodiment and an electronic pen.

FIG. 4 is a diagram illustrating circuit configuration examples of the position detection module 100 included in the high-performance mobile phone terminal 1 in the first embodiment and electronic pen 5. As mentioned above, the position detection module 100 and electronic pen 5 of this embodiment are of the electromagnetic resonance technology type. As illustrated in an upper left part of FIG. 4, the electronic pen 5 is configured to have a resonance circuit owing to the parallel connection of a coil L to be used for the transmission and reception of signals, a writing-pressure detector Cv as a variable capacitor, and a resonant capacitor Cf or the like provided on a circuit board mounted on the electronic pen 5.

In the position detection module 100, there is provided the position detection sensor 3 configured of the position detection coils, specifically the X-axis loop coil group 31X and the Y-axis loop coil group 31Y stacked one over the other. Although curved portions of the detection area 3E are not illustrated in FIG. 4 for the sake of simplification, the position detection sensor 3 is configured so that, as described with reference to FIGS. 3A and 3B, the outer edges of the detection area 3E include the curved portions in conformity with the shapes of the outer edges of the display screen 2D of the LCD 2. Further, the position detection module 100 also includes a selection circuit 106 to which the X-axis loop coil group 31X and Y-axis loop coil group 31Y are connected. The selection circuit 106 selects the loop coils in one of the two loop coil groups 31X and 31Y sequentially one after another.

The position detection module 100 also includes an oscillator 104, a current drive 105, a connection switching circuit 107, a reception amplifier 108, a position detection circuit 109, a writing-pressure detection circuit 110, and a processing control circuit 111. The processing control circuit 111 is configured of a microcontroller. The processing control circuit 111 controls the selection of loop coils in the selection circuit 106 and the switching of the connection switching circuit 107, and also controls processing timings at the position detection circuit 109 and writing-pressure detection circuit 110.

The oscillator 104 generates an alternating current (AC) signal of frequency f0. The oscillator 104 then feeds the generated AC signal to the current driver 105 and writing-ressure detection circuit 110. The current driver 105 converts the AC signal, which has been fed from the oscillator 104, into a current, and delivers the current to the connection switching circuit 107. Under control from the processing control circuit 111, the connection switching circuit 107 switches the connection destination (transmission-side terminal T, reception-side terminal R) to which the loop coil selected by the selection circuit 106 is to be connected. The current driver 105 and reception amplifier 108 are connected to the transmitting-side terminal T and receiving-side terminal R of these connection destinations, respectively.

An induced voltage, which is generated across the loop coil selected by the selection circuit 106, is fed to the reception amplifier 108 via the selection circuit 106 and connection switching circuit 107. The reception amplifier 108 amplifies the induced voltage fed from the loop coil, and delivers the amplified voltage to the position detection circuit 109 and writing-pressure detection circuit 110.

Across each loop coil in the X-axis loop coil group 31X and Y-axis loop coil group 31Y, an induced voltage is generated responsive to an electromagnetic wave transmitted from the electronic pen 5. The position detection circuit 109 detects the induced voltage generated across the loop coil, in other words, a received signal, converts its detection output signal into a digital signal, and outputs the digital signal to the processing control circuit 111. Based on the digital signal from the position detection circuit 109, specifically the voltage level of the induced voltage generated in each loop coil, the processing control circuit 111 calculates the coordinate values of the position pointed by the electronic pen 5 in the X-axis direction and Y-axis direction.

On the other hand, the writing-pressure detection circuit 110 synchronously detects the output signal of the reception amplifier 108 by using the AC signal from the oscillator 104, obtains a signal of a level corresponding to a phase difference (frequency shift) between them, converts the signal into a digital signal, and outputs the digital signal to the processing control circuit 111. Based on the digital signal from the writing-pressure detection circuit 110, that is, the signal level corresponding to the phase difference (frequency shift) between the transmitted electromagnetic wave and the received electromagnetic wave, the processing control circuit 111 detects a writing pressure applied by the electronic pen 5.

It is to be noted that the processing control circuit 111 stores, in its read only memory (ROM) 111M, a so-called lookup table for accurately detecting a desired pointed position near each outer edge of the detection area 3E. This lookup table stores and holds each position pointed by the electronic pen 5 near one of the outer edges of the detection area 3E in association with voltage values generated at that time across plural loop coils, which are located near the pointed position, in the loop coil group 31X and loop coil group 31Y.

Now assume that by this configuration, the position pointed by the electronic pen 5 is detected to be near the one outer edge of the detection area 3E. Described specifically, the lookup table in the ROM 111M is referred to based on the induced voltages generated at that time across the plural loop coils located near the pointed position, whereby the pointed position is accurately specified. It is, therefore, possible to appropriately discriminate whether the pointed position is inside or outside of the detection area 3E. If the pointed position is inside of the detection area 3E, the accurate pointed position can be specified. Especially if the detected pointed position is located near one of the curved portions of the detection area 3E, a significant advantageous effect can be brought about in that the pointed position can be accurately specified.

As is understood from the foregoing, the position detection module 100 of the electromagnetic resonance technology type including the position detection sensor 3 and the electronic pen 5 of the electromagnetic resonance technology type serve as input devices for the high-performance mobile phone terminal 1 in this embodiment, and detailed pointing and input can be performed using the electronic pen 5 of the electromagnetic resonance technology type. The display screen 2D of the LCD 2 includes the curved portions in the four corners (four vertex portions), and in conformity to this configuration of the display screen 2D, the detection area 3E of the detection sensor 3 also includes the curved portions in the corresponding four corners. The position detection module 100 can, therefore, appropriately detect a pointed position wherever position on the display screen 2D, including a vicinity of each curved portion, is pointed by the electronic pen 5.

The loop coils X1, X2, . . . , and X40 and loop coils Y1, Y2, . . . , and Y30, which make up the electrodes of the position detection sensor 3, may each have a single turn or a plurality of turns, i.e., two or more turns. Even in the case of plural-turn loop coils, those which are near the curved portions may be shaped into forms conforming to the corresponding curved portions. Of those which are shaped into a form conforming to each curved portion in the case of the plural-turn loop coils, one of the loop coils may be located outside of the detection area 3E and the remaining loop coils may be located inside of the detection area 3E, whereby the detection sensitivity near the corresponding outer edge of the detection area 3E can be adjusted to an appropriate level.

Second Embodiment

[Schematic Configuration of Electronic Device]

As a second embodiment, a description will next be made with reference to FIGS. 5A, 5B and 6 about a case that the present disclosure is applied to a position detection sensor and position detection module of the capacitive coupling type. The position detection sensor and position detection module of the capacitive coupling type can also be applied to an electronic device such as the high-performance mobile phone terminal 1 having the appearance illustrated in FIG. 1. The schematic configuration of this application is similar to the case of the high-performance mobile phone terminal 1 in the first embodiment described with reference to FIG. 2. However, the position detection sensor 3 of the electromagnetic resonance technology type according to the first embodiment and the position detection sensor 6 of the second embodiment are different in positions where they are disposed.

The position detection sensor 3 of the electromagnetic resonance technology type according to the first embodiment is disposed underneath the LCD 2, while the position detection sensor 6 of the capacitive coupling type according to this second embodiment is disposed above the LCD 2 (on the side of the front panel 1A). In the case of the position detection sensor 6 of the capacitive coupling type, the configuration of a so-called transparent sensor is, therefore, adopted so that an image displayed on the display screen 2D of the LCD 2 can be observed. Also referring to FIG. 2, a description will hereinafter be made about the position detection sensor and position detection module of the second embodiment.

In the high-performance mobile phone terminal in which the position detection sensor 6 of the capacitive coupling type according to the second embodiment is used, its individual component members are stacked in the below-described order (see the example illustrated in FIG. 2). Described specifically, the motherboard 4, the LCD 2 and the position detection sensor 6 of the capacitive coupling type are stacked in this order from the lowermost layer in the casing 1B, and these component members so stacked are sealed by the front panel 1A in the casing 1B.

In this second embodiment, the casing 1B, front panel 1A, motherboard 4 and LCD 2 are each configured as in the above-described first embodiment. The position detection sensor 6 of the capacitive coupling type according to the second embodiment has a similar size to the position detection sensor 3 according to the first embodiment although they are different in configuration. Therefore, the whole LCD 2 and the whole position detection sensor 6 of the second embodiment are also identical in both shape and size in this second embodiment.

The display screen 2D of the LCD 2 is rectangular, and its vertex portions are rounded and formed as curved portions. A detection area 6E of the position detection sensor 6 in the second embodiment is substantially the same in both shape and size as the display screen 2D of the LCD 2. Therefore, the detection area 6E of the position detection sensor 6 is also rectangular, and its vertex portions are also rounded and formed as curved portions.

As mentioned above, the detection area 6E of the position detection sensor 6 is arranged so that the detection area 6E covers over the whole surface of the display screen 2D of the LCD 2. Therefore, individual positions on the display screen 2D precisely correspond to individual positions on the detection area 6E of the position detection sensor 6, so that a pointed position can be accurately detected wherever position on the display screen 2D is pointed.

In this second embodiment, the detection area 6E of the position detection sensor 6 also has the same shape as the display screen 2D of the LCD 2. However, the detection area 6E of the position detection sensor 6 may be dimensioned greater to some extent than the display screen 2D. Further, the detection area 6E may be dimensioned smaller than the display screen 2D insofar as a pointed position can be appropriately detected even in an edge part of the display screen 2D. Therefore, the display screen 2D of the LCD 2 and the detection area 6E of the position detection sensor 6 are in an identical or similar relation like the above-described relation between the display screen 2D of the LCD 2 and the detection area 3E of the position detection sensor 3 according to the first embodiment.

[Configuration of Detection Area 6E of Position Detection Sensor 6]

Figure 5A:
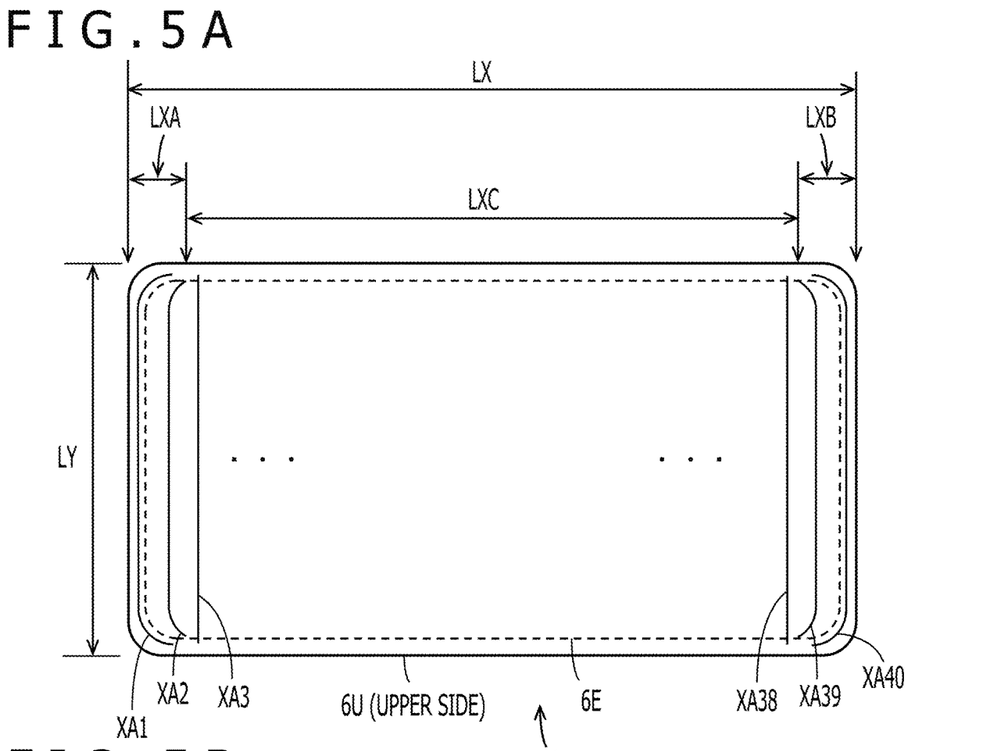
FIGS. 5A and 5B are views for making a description about a configuration example of a position detection sensor according to a second embodiment of the present disclosure.
Figure 5B:
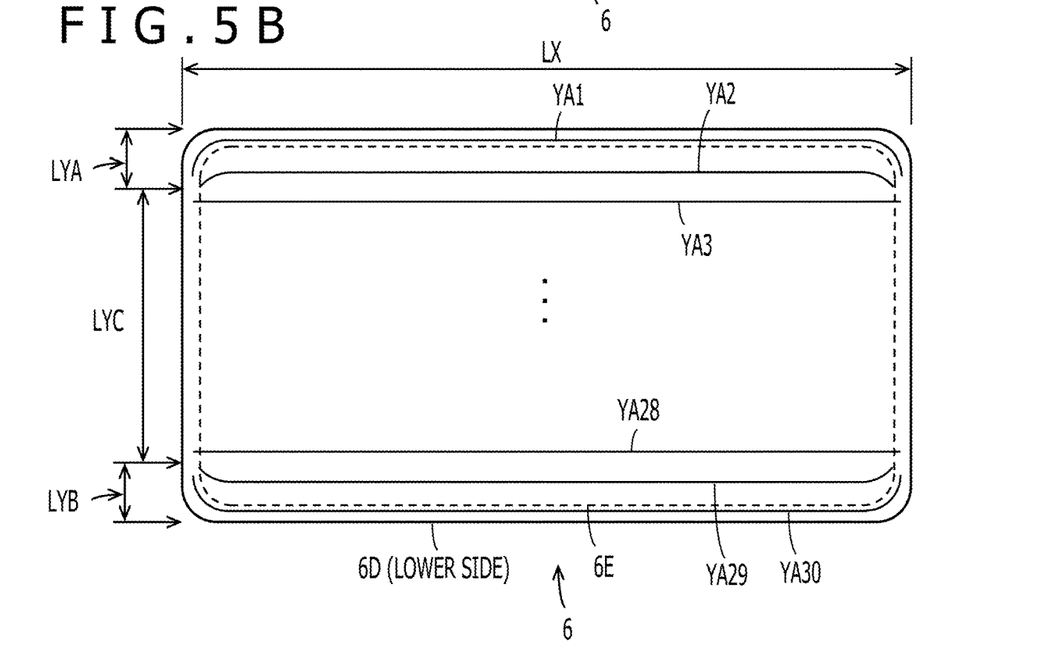

FIGS. 5A and 5B are views for making a description about a configuration example of the position detection sensor 6. The position detection sensor 6 can be formed by placing wire electrodes side by side on an insulating layer 6U, placing wire electrodes side by side on an insulating layer 6D, and bonding the former wire electrodes and latter wire electrodes together with an intermediate insulating layer being interposed between the former wire electrodes and the latter wire electrodes and with the surfaces, on which the wire electrodes are placed side by side, facing each other. The position detection sensor 6 is, therefore, configured by stacking the insulating layer 6D, the Y-axis electrode group 61Y, the intermediate insulating layer, the X-axis electrode group 61X and the insulating layer 6U in this order from the lower side. It is to be noted that the position detection sensor 6 has the same configuration as that of a transparent sensor because the insulating layer 6D, intermediate insulating layer and insulating layer 6U are all transparent and the wire electrodes are all thin wires. The configuration of the position detection sensor 6 will hereinafter be described more specifically.

As illustrated in FIG. 5A, 40 wire electrodes XA1, XA2, . . . , and XA40, which extend in the Y-axis direction in this example, are placed at equal intervals in a longitudinal direction (X-axis direction) on the surface of the insulating layer 6U, whereby the X-axis electrode group 61X is formed. As illustrated in FIG. 5B, on the other hand, 30 wire electrodes YA1, YA2, . . . , and YA30, which extend in the X-axis direction in this example, are placed at equal intervals in a direction (Y-axis direction) intersecting the longitudinal direction on the surface of the insulating layer 6D, whereby the Y-axis electrode group 61Y is formed.

In FIGS. 5A and 5B, the inside of a part indicated by dashed lines on each of the insulating layers 6U and 6D is the detection area 6E. As illustrated in FIG. 5A, on the insulating layer 6U, a vertically-long, rectangular, partly-curved contour region is provided on a left-end side as viewed in the X-axis direction. The vertically-long, rectangular, partly-curved contour region is surrounded by long sides of length LY in the Y-axis direction and short sides of length LXA in the X-axis direction from the left end of the position detection sensor 6. Similarly, another vertically-long, rectangular, partly-curved contour region is provided on a right end side as viewed in the X-axis direction. This vertically-long, rectangular, partly-curved contour region is surrounded by long sides of length LY in the Y-axis direction and short sides of length LXB in the X-axis direction from the right end of the position detection sensor 6.

In the position detection sensor 6 of this second embodiment, one or more wire electrodes, specifically two wire electrodes disposed in each of the partly-curved contour region on the side of the left end (the region of LY×LXA) and the partly-curved contour region on the side of the right end (the region of LY×LXB) are also shaped in conformity to the corresponding curved portions on the corresponding outer edge of the detection area 6E. Described specifically, the wire electrodes XA1 and XA2 located in the partly-curved contour region (the region of LY×LXA) on the side of the left end are curved at opposite ends thereof in conformity to the corresponding curved portions (vertex portions) on the side of the left end of the detection area 6E. Similarly, the wire electrodes XA39 and XA40 located in the partly-curved contour region (the region of LY×LXB) on the side of the right end are curved at opposite ends thereof in conformity to the corresponding curved portions (vertex portions) on the side of the right end of the detection area 6E.

As illustrated in FIG. 5A, on the insulating layer 6U, a region other than the vertically-long, rectangular, partly-curved contour regions on both of the left and right ends, specifically a horizontally-long, rectangular region flanked by the left and right, partly-curved contour regions and surrounded by the sides of length LY in the Y-axis direction and the sides of length LXC in the X-axis direction will hereinafter be referred to as "the straight contour region." As indicated by the wire electrodes XA3 and XA38 in FIG. 5A, for example, the wire electrodes XA3 to XA38 located in the straight contour region are provided as straight wire conductors as in the past.

On the insulating layer 6D, on the other hand, as illustrated in FIG. 5B, a horizontally-long, rectangular, partly-curved contour region is provided on the side of the upper end in the Y-axis direction. The horizontally-long, rectangular, partly-curved contour region is surrounded by the short sides of length LYA in the Y-axis direction from the upper end of the position detection sensor 6 and long sides of length LX in the X-axis direction. Similarly, another horizontally-long, rectangular, partly-curved contour region is provided on the side of the lower end in the Y-axis direction. This horizontally-long, rectangular, partly-curved contour region is surrounded by the short sides of length LYB in the Y-axis direction from the lower end of the position detection sensor 6 and the long sides of length LX in the X-axis direction.

In the position detection sensor 6 of this second embodiment, one or more, specifically two wire electrodes disposed in each of the partly-curved contour region (the region of LYA×LX) on the side of the upper end and the partly-curved contour region (the region of LYB×LX) on the side of the lower end are also shaped in conformity to the corresponding curved portions on the corresponding outer edge of the detection area 6E. Described specifically, the wire electrodes YA1 and YA2 located in the partly-curved contour region (the region of LYA×LX) on the side of the upper end are curved at opposite ends thereof in conformity to the corresponding curved portion (vertex portion) on the side of the upper end of the detection area 6E. Similarly, the wire electrodes YA29 and YA30 located in the partly-curved contour region (the region of LYB×LX) on the side of the lower end are curved at opposite ends thereof in conformity to the corresponding curved portion (vertex portion) on the side of the lower end of the detection area 6E.

As illustrated in FIG. 5B, on the insulating layer 6D, a region other than the horizontally-long, partly curved contour regions provided on the sides of both of the upper and lower ends, specifically a horizontally-long, rectangular region flanked by the upper and lower, partly-curved contour regions surrounded by the sides of length LYC in the Y-axis direction and the sides of length LX in the X-axis direction will hereinafter be referred to as "the straight contour region." As indicated by the wire electrodes YA3 and YA28 in FIG. 5B, for example, the wire electrodes YA3 to YA28 located in the straight contour region are provided as straight wire conductors as in the past.

As described in the above, the X-axis electrode group 61X is formed on the insulating layer 6U, and the Y-axis electrode group 61Y is formed on the insulating layer 6D. As also mentioned in the above, the position detection sensor 6 of the capacitive coupling type is formed by bonding the X-axis electrode group 61X and Y-axis electrode group 61Y together with the intermediate insulating layer being interposed therebetween and with the surfaces, on which the wire electrodes are placed side by side, facing each other. As a consequence, in the position detection sensor 6, the detection area 6E is formed correspondingly to the display screen 2D of the LCD 2 with the four corners (four vertex portions) thereof being formed as the curved portions.

[Circuit Configuration Examples of Position Detection Module 200 and Electronic Pen 7 of Capacitive Coupling Type]

Figure 6:
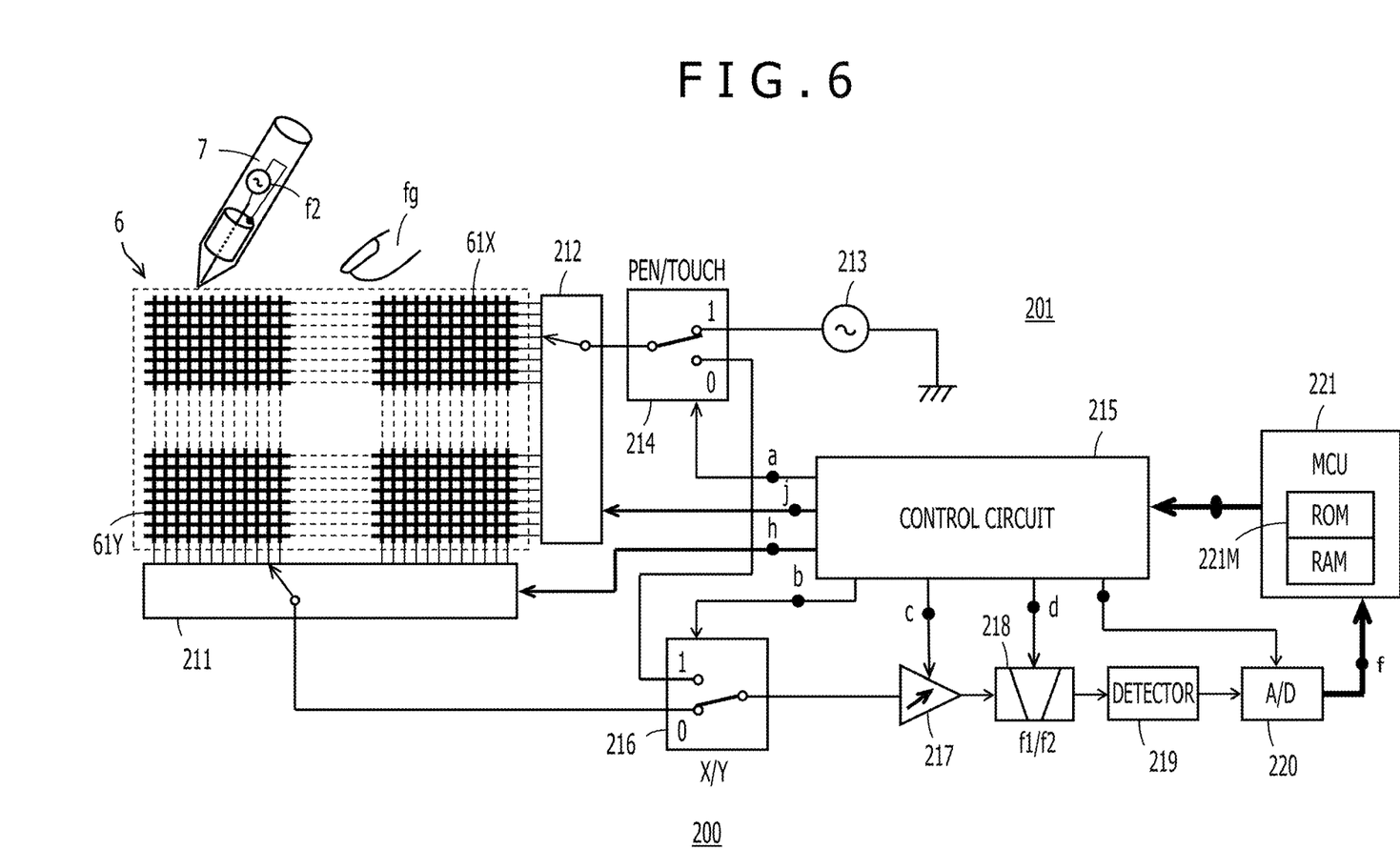
FIG. 6 is a diagram illustrating circuit configuration examples of a position detection module according to the second embodiment and an electronic pen.

FIG. 6 is a diagram illustrating circuit configuration examples of the position detection module 200, which is configured using the position detection sensor 6 of the second embodiment, and of the electronic pen 7 to be used in performing pointing and input to the position detection module 200. To the position detection sensor 6 of this second embodiment, pointing and input can also be performed using user's finger fg or a pointer that is called "a passive pen" or the like and realizes an equivalent function as in the use of user's finger fg.

As illustrated in FIG. 6, the position detection module 200 of this second embodiment is configured of the position detection sensor 6 of the above-mentioned configuration and a position detection circuit 201. The position detection circuit 201 is a circuit unit configured from respective components labeled with reference numerals of 210s and 220s. In FIG. 6, an X-selector circuit 211 is connected to the electrodes (hereinafter referred to as "the X-electrodes") that make up the X-axis electrode group 61X in the position detection sensor 6, and selects one of the X-electrodes XA1 to XA40 (see FIG. 5A). A Y-selector circuit 212 is connected to the electrodes (hereinafter referred to as "the Y-electrodes") that make up the Y-axis electrode group 61Y in the position detection sensor 6, and selects one of the Y-electrodes YA1 to YA30 (see FIG. 5B).

An oscillator 213 generates a signal at a frequency of f1. By a control signal a from a control circuit 215, a switching circuit 214 switches to which one of an output terminal of the oscillator 213 and an input terminal of a gain control circuit 217 to be described subsequently herein the Y-electrode selected by the Y-selector circuit 212 is to be connected.

An output voltage having a frequency of f2 from the oscillator 213 is fed between an electrode on a tip portion of the electronic pen 7 and an outer peripheral electrode surrounding the first-mentioned electrode, so that the electronic pen 7 has a function to deliver a position pointing signal to the position detection sensor 6. The electronic pen 7 is of the active capacitive coupling type.

A switching circuit 216 selects one of the X-electrode selected by the X-selector circuit 211 and the Y-electrode selected by the Y-selector circuit 212 by way of the switching circuit 214, and connects the selected X-electrode or Y-electrode to the gain control circuit 217. Described specifically, if it is desired to allow the position detection module 200 to operate for touch detection, the control circuit 215 selects to switch the switching circuit 216 to the side of the X-selector circuit 211.

If it is desired to allow the position detection module 200 to operate for pen detection and to determine the X-axis coordinate of a position pointed by the electronic pen 7, the control circuit 215 selects by a control signal b to switch the switching circuit 216 to the side of the X-selector circuit 211. If it is desired to allow the position detection module 200 to operate for pen detection and to determine the Y-axis coordinate of the position pointed by the electronic pen 7, on the other hand, the control circuit 215 selects by a control signal b to switch the switching circuit 216 to the side of the Y-selector circuit 212. An output from the switching circuit 216 is connected to the gain control circuit 217. This gain control circuit 217 is set so that the output from the switching circuit 216 is adjusted to an output signal of an appropriate level by a control signal c from the control circuit 215.

A band-pass filter circuit 218 has a predetermined band width centered at the frequency f1 or the frequency f2, and is switched to have a center frequency at f1 if the position detection module 200 is allowed to operate for touch detection by a control signal d from the control circuit 215 or a center frequency at f2 if the position detection module 200 is allowed to operate for pen detection by a control signal d from the control circuit 215. An output signal of the band-pass filter circuit 218 is detected by a detector circuit 219 and is then fed to an analog/digital (A/D) conversion circuit 220, and a digital data output f from the A/D conversion circuit 220 is read and processed by a microcontroller unit (MCU) 221.

The control circuit 215 feeds a control signal h to the X-selector circuit 211, so that the X-selector circuit 211 selects the X-electrodes sequentially one after another. In addition, the control circuit 215 also feeds a control signal j to the Y-selector circuit 212, so that the Y-selector circuit 212 selects the Y-electrodes sequentially one after another. The MCU 221 is internally provided with a ROM 221M and a random access memory (RAM), and operates by a program stored in the ROM 221M.

Upon operating the position detection module 200 of FIG. 6 for touch detection, a signal of the frequency f1 is fed from the oscillator 213 to one of the Y-electrodes as selected at the Y-selector circuit 212. Then, one of the X-electrodes as selected by the X-selector circuit 211 is connected to the gain control circuit 217 via the switching circuit 216. A signal, which is induced by capacitive coupling at an intersection formed by the one X-electrode selected by the X-selector circuit 211 and the one Y-electrode selected by the Y-selector circuit 212, is adjusted in gain at the gain control circuit 217.

Upon operating the position detection module 200 of FIG. 6 for pen detection, on the other hand, the X-electrodes selected sequentially at the X-selector circuit 211 are connected to the gain control circuit 217 via the switching circuit 216. Then, the Y-electrodes selected sequentially at the Y-selector circuit 212 are connected to the gain control circuit 217 via the switching circuit 214 and switching circuit 216.

When the electronic pen 7 comes close to one of the X-electrodes and one of the Y-electrodes so selected, signals are induced responsive to a signal from the electronic pen 7 at the X-electrode and Y-electrode to which the electronic pen 7 has come close, so that the induced signals are fed to the gain control circuit 217. As a consequence, it is possible to detect that the electronic pen 7 is located near the intersection of the X-electrode and Y-electrode where the respective induced signals exist.

It is to be noted that the MCU 221 includes a so-called lookup table in the ROM 221M to precisely detect a position pointed near each outer edge of the detection area 6E. This lookup table stores and holds position-specifying information for both touch detection and pen detection.

Described specifically, as the position-specifying information for touch detection, a desired position pointed by the finger fg or the like near each outer edge of the detection area 6E and the intensities of signals induced in plural Y-axis electrodes in the X-axis electrode group 61X, the plural Y-axis electrodes being located around the pointed position, are stored and held in association with each other. As the position-specifying information for pen detection, a desired position pointed by the electronic pen 7 near each outer edge of the detection area 6E and the intensities of signals induced in plural electrodes in the X-axis electrode group 61X and Y-axis electrode group 61Y, the plural electrodes being located around the pointed position, are stored and held in association with each other.

Now assume that a position pointed by the finger or the like upon touch detection has been detected to be near one of the outer edges of the detection area 6E. Here, the pointed position can be accurately specified by referring to the lookup table in the ROM 221M based on the intensities of signals generated in plural X-electrodes around the position pointed at that time. Similarly, also assume that the position pointed by the electronic pen 7 upon pen detection has been detected to be near one of the outer edges of the detection area 6E. Here, the pointed position can be accurately specified by referring to the lookup table in the ROM 221M based on the intensities of signals generated in plural X-electrodes and Y-electrodes around the position pointed at that time.

It is, therefore, possible to appropriately discriminate whether the pointed position is inside or outside of the detection area 6E. If the pointed position is inside of the detection area 6E, the accurate pointed position can be specified. Especially if the detected pointed position is located near one of the curved portions of the detection area 6E, a significant advantageous effect can be brought about in that the pointed position can be accurately specified.

As is understood from the foregoing, the position detection module 200 of the capacitive coupling type including the position detection sensor 6 and the pointer such as the electronic pen 7 of the capacitive coupling type or user's finger fg serve as input devices for the high-performance mobile phone terminal 1 in this second embodiment, and pointing and input can be appropriately performed using the indicator such as the electronic pen 7 of the capacitive coupling type or user's finger. The display screen 2D of the LCD 2 includes the curved portions in its four vertex portions, and in conformity to this configuration of the display screen 2D, the detection area 6E of the position detection sensor 6 also includes the curved portions in the four corners. The position detection module 200 can, therefore, appropriately detect a pointed position wherever position on the display screen 2D, including a vicinity of each curved portion, is pointed by the pointer such as the electronic pen 7 or the finger fg.

[Application of Disclosure to Electronic Device Including Display Screen Expanded to Side Wall Parts of Electronic Device]

In the above-mentioned embodiments, the display screen 2D of the LCD 2 is planar as illustrated in FIG. 2. In recent years, however, there are also those which have a display screen expanded to the parts of side walls of an electronic device such as a high-performance mobile phone terminal by bending the display screen at the parts of its left and right long sides.

Figure 7A:
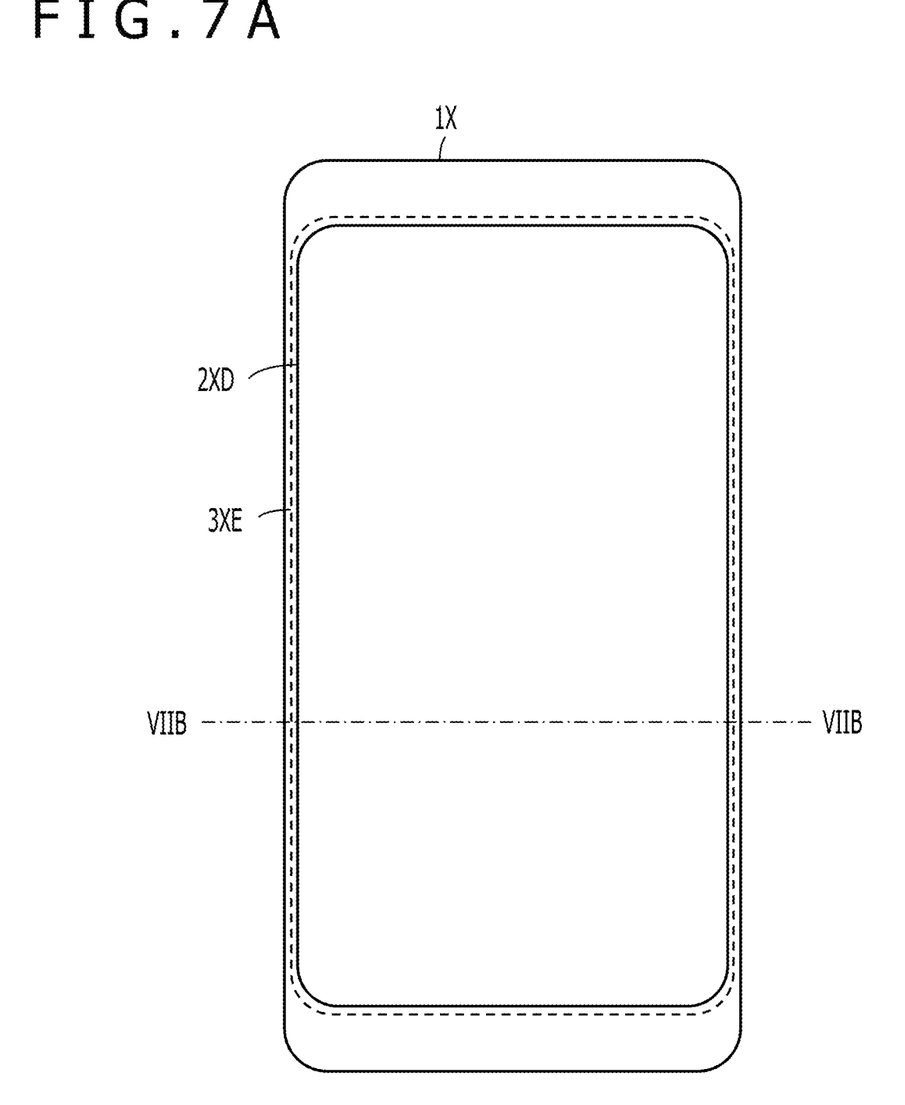
FIGS. 7A and 7B are views for making a description of an example of a high-performance mobile phone terminal with a display screen expanded to side wall portions.
Figure 7B:
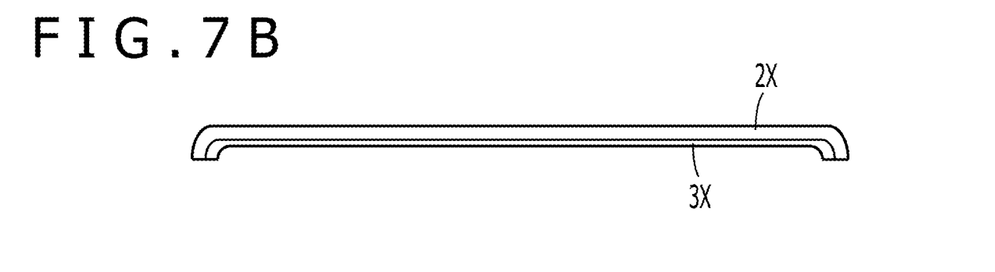

FIGS. 7A and 7B are views for describing an example of a high-performance mobile phone terminal with a display screen expanded to the parts of its side walls. A high-performance mobile phone terminal 1X illustrated in FIG. 7A will be described assuming that it has a position detection module of the electromagnetic resonance technology type. As illustrated in the front view of FIG. 7A, a display screen 2XD of a display device 2X of the high-performance mobile phone terminal 1X of this example is bent into curved walls at the parts of its left and right long sides, whereby the display screen 2XD has a configuration that it has been expanded to the left and right side walls.

FIG. 7B is an enlarged cross-sectional view taken along line VIIB-VIIB in FIG. 7A. As is appreciated by observing the cross-sectional view of FIG. 7B, the display device (LCD) 2X has a configuration that the parts of its long sides are bent downward in the figure. Therefore, the display screen 2XD of the LCD 2X is configured to allow displaying to the parts of its left and right side walls. Further, as illustrated in FIG. 7A, the display screen 2XD also has rounded curved portions in its four corners similarly to the display screen 2D of the high-performance mobile phone terminal 1 of the above-mentioned each embodiment.

In conformity to the display screen 2XD of the high-performance mobile phone terminal 1X of this example configured as described above, a detection area 3XE of a position detection sensor 3X is configured to have rounded curved portions in its four corners in correspondence to the four corners of the display screen 2XD, as in the above-mentioned position detection sensor 3 of the first embodiment. In addition, the position detection sensor 3X of this example also has a configuration that as illustrated in FIG. 7B, the parts of its long sides are bent downward in the figure. In conformity to the bent parts of the long sides of the LCD 2X, the corresponding ones of the loop coils which configure the position detection sensor 3X are each bent accordingly. As described above, the detection area 3XE of the position detection sensor 3X is formed as the curved portions in its four corners, and has the configuration that the parts of its long sides are bent downward in the figure.

It is, therefore, possible to configure the high-performance mobile phone terminal 1X including the position detection sensor 3X that has the detection area 3XE corresponding to the display screen 2XD which is bent at the parts of its left and right long sides and can also display information at the parts of its side walls. It is, hence, possible to arrange, for example, icons on the parts of the side walls of the display screen 2XD of the high-performance mobile phone terminal 1X and to select desired one of the icons by an electronic pen.

Obviously, because of the existence of the curved portions in the four corners, partly-curved contour regions are provided as in the high-performance mobile phone terminal 1 of the above-mentioned each embodiment, and the loop coils are configured at the portions thereof disposed in the partly-curved contour regions to have curved forms in conformity to the display screen 2XD. The position detection sensor 3X can, therefore, appropriately detect positions pointed by the electronic pen even in the parts of the four corners of the display screen 2XD.

Here, the position detection sensor 3X is described as a sensor of the electromagnetic resonance technology type. When a position detection sensor of the capacitive coupling type is used instead, a similar configuration can also be applied. The position detection sensor of the capacitive coupling type can be configured as described above with reference to FIGS. 5A and 5B. The parts of both of its long sides may be bent in conformity to the display screen 2XD to form a detection area having a bent configuration.

For both a position detection module of the electromagnetic resonance technology type and a position detection module of the capacitive coupling type, in the case of a rectangular display screen, for example, a position detection sensor can be configured correspondingly to a display device configured by forming the part of a side wall as a curved wall at one of the four sides. Therefore, the part or parts of a desired side wall or desired side walls at one or more sides can be formed as a curved wall or curved walls. Even if the parts of side walls at all the four sides are formed as curved walls, a corresponding position detection sensor can be configured. Moreover, even if one or more curved portions are included on outer edges, a position detection sensor can be configured correspondingly to such a display screen.

[Advantageous Effects of Embodiments]

As mentioned above, the display screen 2D of the LCD 2 has a curved shape at its four corners. For the position detection sensor 3 of the electromagnetic resonance technology type, partly-curved contour regions are hence also provided correspondingly to the display screen 2D. Among the loop coils that make up the position detection sensor 3, at least portions of the loop coils disposed in the partly-curved contour regions are configured to be curved in conformity to the corresponding curved portions of the display screen 2D. Therefore, the detection area 3E of the position detection sensor 3 can be configured to have curved portions in correspondence to the display screen 2D. As a consequence, the four corners of the position detection sensor 3 can be configured to have a curved form. Further, the position detection sensor 3 having a curved form at the four corners thereof can be disposed correspondingly to the display screen 2D having a curved form at the four corners thereof and mounted in conformity to the casing of the high-performance mobile phone terminal 1 having a curved form at the four corners thereof. Furthermore, it is also possible to realize the position detection sensor 3 for the position detection module of the electromagnetic resonance technology type that can appropriately detect pointed positions even near the curved portions.

In the position detection sensor 6 of the capacitive coupling type, the partly-curved contour regions are also provided correspondingly to the display screen 2D. Among the wire electrodes that make up the position detection sensor 6, at least portions of the wire electrodes disposed correspondingly to the partly-curved contour regions are configured to be curved in conformity to the curved portions of the display screen 2D. Therefore, the detection area 6E of the position detection sensor 6 can be configured to have a curved portion in correspondence to the display screen 2D. As a consequence, it is also possible to realize, for the position detection module of the capacitive coupling type, the position detection sensor 6 that can appropriately detect pointed positions even near the curved portions.

[Modifications]

In the above-mentioned embodiments, the display screen 2D has curved portions at all of the four corners thereof, although the display screen 2D is not restricted to such a configuration. If at least one of the four corners is a curved portion, the detection area of a position detection sensor may have a curved portion at the corresponding corner.

The curved portions are not limited to the four corners of the display screen. For example, it may be contemplated to use a circular or elliptical display screen. In such a case, in order to provide the detection area of a position detection sensor with one or more curved portions on the outer edge or edges thereof in conformity to the shape of the display screen to be used, the loop coils or wire electrodes that form the detection area may be configured to be curved at the corresponding portions thereof.

Further, the rectangular display screen may be considered to be formed at the part of one of its long sides into such a curved portion as defining an arc of a circle. In such a case, in order to provide the detection area of a position detection sensor with a curved portion on the corresponding outer edge thereof in conformity to the curved portion of the display screen, the loop coils or wire electrodes that form the detection area may be configured to be curved at the corresponding portions.

As has been described above, it has become a practice from the viewpoint of placement of importance on design features or the like in recent years to form the four corners as a curved shape, to configure a display screen with a curved line such as a circular shape or elliptical shape, or to configure a display screen in a shape that one or more curved lines are included on its outer edge or edges. Keeping in step with this trend, in an arrangement area of loop coils or wire electrodes that make up the detection area of a position detection sensor in correspondence to the display screen, partly-curved contour regions where the opposite end portions of the loop coils or wire electrodes should be configured in a curved form are appropriately set. By configuring the loop coils or wire electrode, which are arranged as the curved form in the partly-curved contour regions in correspondence to the shape of the display screen, a position detection sensor that has a detection area in conformity to the shape of the display screen can be configured.

As the manner of the setting of the partly-curved contour regions, a straight contour region may be set to secure as large a part as possible, and the parts other than the straight contour region may be set as partly-curved contour regions. In the case of a position detection sensor having a detection area corresponding to a circular display screen, for example, a square inscribed in the circular display screen may be set as a straight contour region, and partly-curved contour regions may then be set to include circular segments located outside the four sides of the inscribed square.

Although the preferred embodiments have been described in detail above, it should be understood that various changes and modifications may be made therein without departing from the scope of the appended claims.

What is claimed is:

1. A position detection sensor configured to be used with a display device having a display screen with a plurality of curved portions included on-an a plurality of vertices of a plurality of outer edges of the display screen, the position detection sensor comprising:
   a plurality of electrodes arranged in a detection area and configured to detect a position on the display screen pointed to by a pointer,
   wherein two or more of the electrodes arranged in the detection area are configured to extend between two of the curved portions included on the vertices of the outer edges of the display screen,
   wherein two curved portions are formed at opposite ends of each formed at opposite ends of each of the two or more of the electrodes, and
   wherein the curved portions formed at opposite ends of each of the two or more of the electrodes are configured to conform to the two of the curved portions included on the vertices of the outer edges of the display screen in a partly-curved contour region of the detection area corresponding to a predetermined region of the display device that includes the two of the curved portions included on the vertices of the outer edges of the display screen.

2. The position detection sensor according to claim 1, wherein:
   the detection area is configured to be disposed adjacent to the display screen of the display device, and has a shape corresponding to a shape of the display screen.

3. The position detection sensor according to claim 1, wherein:

the electrodes arranged in the detection area, other than the two or more of the electrodes, are straight and are arranged in a straight contour region corresponding to a region of the display device other than the predetermined region that includes the two of the curved portions included on the vertices of the outer edges of the display screen.

4. The position detection sensor according to claim 1, wherein:
the display screen has a polygonal shape,
the two of the curved portions included on the vertices of the outer edges of the display screener are provided in at least two corner portions of the display screen having the polygonal shape, and
the partly-curved contour region of the detection area is configured to be provided adjacent to the predetermined region of the display device that includes the at least two corner portions in which the two of the curved portions included on the vertices of the outer edges of the display screener are provided.

5. The position detection sensor according to claim 1, wherein:
the electrodes arranged in the detection area are transparent electrodes, and are configured to be arranged over the display screen of the display device.

6. The position detection sensor according to claim 1, wherein:
the position detection sensor is configured to be to be arranged on a side of display device that is opposite to a side of display device including the display screen.

7. The position detection sensor according to claim 1, wherein:
the electrodes arranged in the detection area are loop coils.

8. The position detection sensor according to claim 1, wherein:
the electrodes arranged in the detection area are wire electrodes.

9. The position detection sensor according to claim 1, wherein:
the display screen of the display device has a curved surface, and
the detection area has a curved surface that conforms to the curved surface of the display screen.

10. A position detection module comprising:
a display device having a display screen with a plurality of curved portions included on a plurality of vertices of a plurality of outer edges of the display screen,
a position detection sensor arranged adjacent to the display device, the position detection sensor including a plurality of electrodes arranged in a detection area and configured to detect a position on the display screen pointed to by a pointer,
wherein two or more of the electrodes arranged in the detection area extend between two of the curved portions included on the vertices of the outer edges of the display screen,
wherein two curved portions are formed at opposite ends of each of the two or more of the electrodes, and
wherein the two curved portions of each formed at opposite ends of each of the two or more of the electrodes conform to the two of the curved portions included on the vertices of the outer edges of the display screen in a partly-curved contour region of the detection area corresponding to a predetermined region of the display device that includes the two of the curved portions included on the vertices of the outer edges of the display screen; and
a pointed position detection circuit configured to detect the position on the display screen pointed to by the pointer based on signals from one or more of the electrodes arranged in the detection area.

11. The position detection module according to claim 10, wherein:
the detection area is disposed adjacent to the display screen of the display device, and has a shape corresponding to a shape of the display screen.

12. The position detection module according to claim 10, wherein:
the electrodes arranged in the detection area, other than the two or more of the electrodes, are straight and are arranged in a straight contour region of the detection area adjacent to a region of the display device other than the predetermined region that includes the two of the curved portions included on the vertices of the outer edges of the display screen.

13. The position detection module according to claim 10, wherein:
the display screen has a polygonal shape,
the two curved portions included on the vertices of the outer edges of the display screen are provided in at least two corner portions of the display screen having the polygonal shape, and
the partly-curved contour region of the detection area is adjacent to the predetermined region of the display device including the two of the corner portion portions in which the curved portions included on the vertices of the outer edges of the display screen are provided.

14. The position detection module according to claim 10, wherein:
the electrodes arranged in the detection area are transparent electrodes, and are arranged over the display screen of the display device.

15. The position detection module according to claim 10, wherein:
the position detection sensor is arranged on a side of the display device that is opposite to a side of the display device that includes the display screen.

16. The position detection module according to claim 10, wherein:
the electrodes arranged in the detection area are loop coils.

17. The position detection module according to claim 10, wherein:
the electrodes arranged in the detection area are wire electrodes.

18. The position detection module according to claim 10, wherein:
the display screen of the display device has a curved surface, and
the detection area has a curved surface that conforms to the curved surface of the display screen.

* * * * *

UNITED STATES PATENT AND TRADEMARK OFFICE
CERTIFICATE OF CORRECTION

PATENT NO. : 10,936,093 B2  
APPLICATION NO. : 16/036421  
DATED : March 2, 2021  
INVENTOR(S) : Takeshi Kobori et al.

Page 1 of 1

It is certified that error appears in the above-identified patent and that said Letters Patent is hereby corrected as shown below:

In the Claims

Column 18, Claim 1, Line 39:
"curved portions included on-an a plurality of vertices"
Should read:
--curved portions included on a plurality of vertices--.

Column 19, Claim 4, Line 12:
"the outer edges of the display screener are"
Should read:
--the outer edges of the display screen are--.

Column 19, Claim 4, Line 20:
"the display screener are provided."
Should read:
--the display screen are provided.--.

Signed and Sealed this  
Thirtieth Day of November, 2021

Drew Hirshfeld  
*Performing the Functions and Duties of the*  
*Under Secretary of Commerce for Intellectual Property and*  
*Director of the United States Patent and Trademark Office*